ALPHA TRUXENE
10.15-DIHYDRO-5H-DIINDENO [1,2-a:1',2'-c] FLUORENE

BETA OR ISOTRUXENE
10.15, DIHYDRO-5H-DIINDENO [2,1-a:1',2'-c] FLUORENE

DENSITY ON GRAPHITIZATION OF MIXTURES OF
α TRUXENE & β TRUXENE AT DIFFERENT
COMPOSITIONS AS A FUNCTION OF TEMPERATURE.

DENSITY ON GRAPHITIZATION OF MIXTURES OF PARTIALLY POLYMERIZED FURFURYL ALCOHOL & β TRUXENE DERIVED RESIN AS A FUNCTION OF TEMPERATURE.

United States Patent Office 3,717,622
Patented Feb. 20, 1973

3,717,622
TRUXENE POLYMER AND METHOD
FOR ITS PREPARATION
William Lyle Harper, Wartburg, and Wesley Earl Smith, Oak Ridge, Tenn., assignors to the United States of America as represented by the United States Atomic Energy Commission
Original application Sept. 9, 1968, Ser. No. 758,391. Divided and this application June 10, 1970, Ser. No. 57,029
Int. Cl. C08f 7/02
U.S. Cl. 260—93.5 C    3 Claims

ABSTRACT OF THE DISCLOSURE

This invention relates to a method for polymerizing truxene which comprises heating truxene in an oxygen containing atmosphere below a corbonizing temperature. The resultant polymer will yield a graphite product when exposed to graphitizing conditions if the polymer is derived from beta truxene. If the polymer is derived from alpha truxene, the resulting product is an amorphous carbon. Mixtures containing a predominant amount of beta truxene and lesser amounts of a non-graphitizing binder yield a graphitized product.

Figure 2:
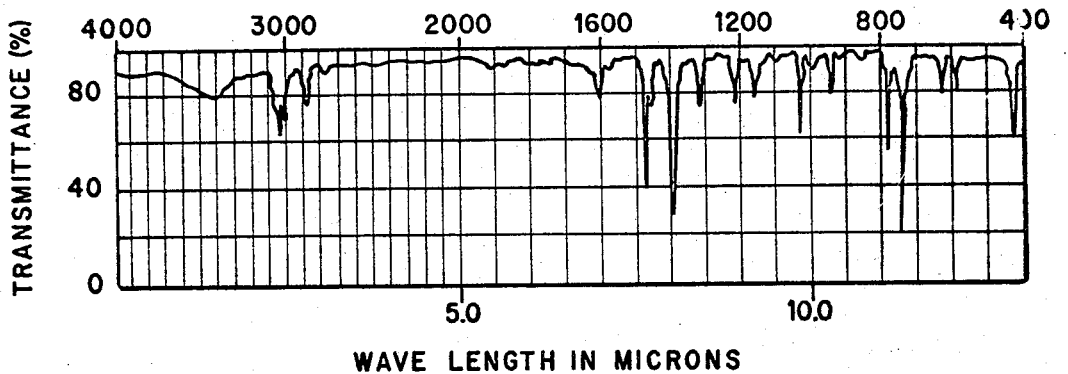

This application is a division of our copending application S.N. 758,391, filed Sept. 9, 1968, and now U.S. Pat. No. 3,535,081.

BACKGROUND OF THE INVENTION

The invention described herein was made in the course of, or under a contract with the U.S. Atomic Energy Commission.

The present invention relates to the production of amorphous or graphitic carbon from a derivative of indene.

Amorphous or graphitic carbon structures are normally made by compounding a mixture of an organic binder with a filler material (such as carbon, coke, decomposable organic or inorganic salts, etc.) to form either a densified or porous product after carbonization and/or graphitization of the binder material. Whether the final product is a densified or porous structure, the carbonized binder material will serve as the matrix and principal strength-providing source for the structure. Among the most commonly employed binders for making amorphous or graphitic carbon structures are pitch and polymerized furfuryl alcohol. In use, a compound mixture of binder and filler is cast, molded, or pressed to the geometry and approximate dimensions of the final article and then heat treated to a temperature in the range 900 to 1000° C. in an inert atmosphere to carbonize the binder. Further heat treatment at a temperature in the range 2800 to 3000° C. will, in some cases, result in a graphitized structure.

One of the principal difficulties experienced with binders of the prior art results from the excessive loss of binder, due to volatilization, during the carbonization reaction. The extent of carbon loss is measured by the coke yield defined as that fraction (expressed in weight percent) of an initial sample which remains as residual carbon at 1000° C. It is thus clear that a binder with a low coke yield results in considerable shrinkage in size, weight, and volume relative to its pre-coked dimensions to yield a final structure which is relatively weak in strength.

The present invention is concerned with, and it is an object of this invention to provide, a novel binder in place of, or in conjunction with, other binders used in making amorphous or graphitic carbon articles.

Another object of this invention is to provide an organic binder which has a usefully high coke yield.

A further object is to provide a method of making a graphitizable or amorphous carbon binder at will.

Still another object is to provide a method for synthesizing an organic binder of the character described.

For the sake of clarity, the following terms are defined and will be used in the specification and claims.

(1) Coking cycle.—In general terms, a time-rate controlled curing cycle designed to give a maximum coking yield for a particular cycle. A typical curing cycle for truxene consists of heating in air at a stepwise increase in temperature over a 48-hour period until a temperature in the range 250 to 300° C. is reached and maintained. This is followed by carbonization by heating for about 50 hours in an inert atmosphere to 1000° C.

(2) Graphitization.—The process of heating graphitizable carbon to 2700 to 3000° C. to effect orientation of its structure.

(3) Truxene.—The generic name for molecules formed by the trimerization and subsequent oxidation of indene as represented by the empirical formula $C_{27}H_{18}$.

(4) α-Truxene.—A structural isomer of truxene designated by the formula 10,15-dihydro-5H-diindeno-[1,2-a:1′,2′-C]-fluorene.

(5) β-Truxene.—A second structural isomer of truxene designated by the formula 10,15-dihydro-5H-diindeno-[2,1-a:1′,2′-O]-fluorene.

(6) Graphitic carbon.—A graphitic product produced by exposure of β-truxene or mixtures thereof to a carbonizing and graphitizing reaction, said product being characterized in that its (a) Lattice parameters, as determined from X-ray diffraction scans, are very close to theoretical values given for graphite, and its (b) Helium density, as determined by Gutmacher, Harrar, and Pearson (Gutmacher, R. G., Harrar, J. E., and Pearson, R. K., "Some Recently Developed Chemical and Physical Analytical Methods," UCRL-6639, April 30, 1961) is in the range of theoretical values reported for graphite.

(7) Partially polymerized furfuryl alcohol.—A mixture of furfuryl alcohol polymers having an average molecular weight of approximately 400, as determined by vapor pressure osmometry.

SUMMARY OF THE INVENTION

In its product aspect, the present invention comprises:
(1) A thermoplastic resin resulting from the polymerization of beta truxene on heating in air to 250° C. (generally from 24 to 30 hours) to a low melting plastic resin.
(2) The product resulting from carbonization of the thermoplastic resin; and
(3) The product resulting from graphitization of the thermoplastic resin.

In its process aspect, the present invention will deal first with a unique method for making either one of the aforementioned isomers of truxene and then with methods for converting beta truxene to the aforementioned products (1) to (3), inclusive.

Figure 1:
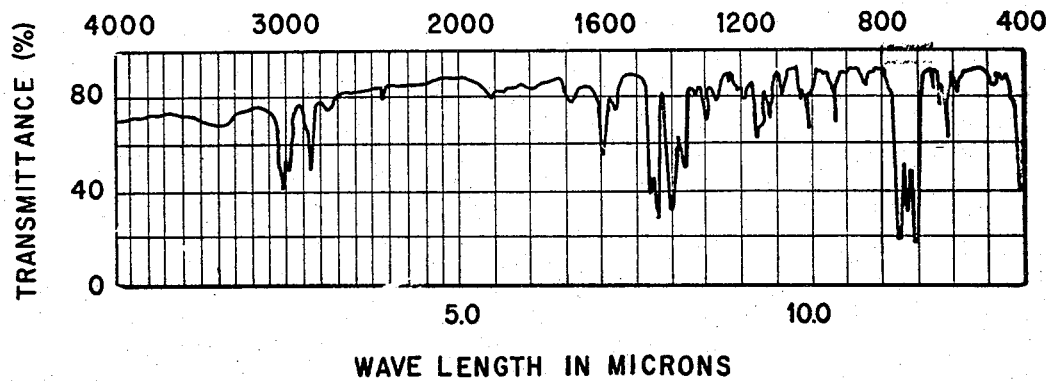
Figure 3:
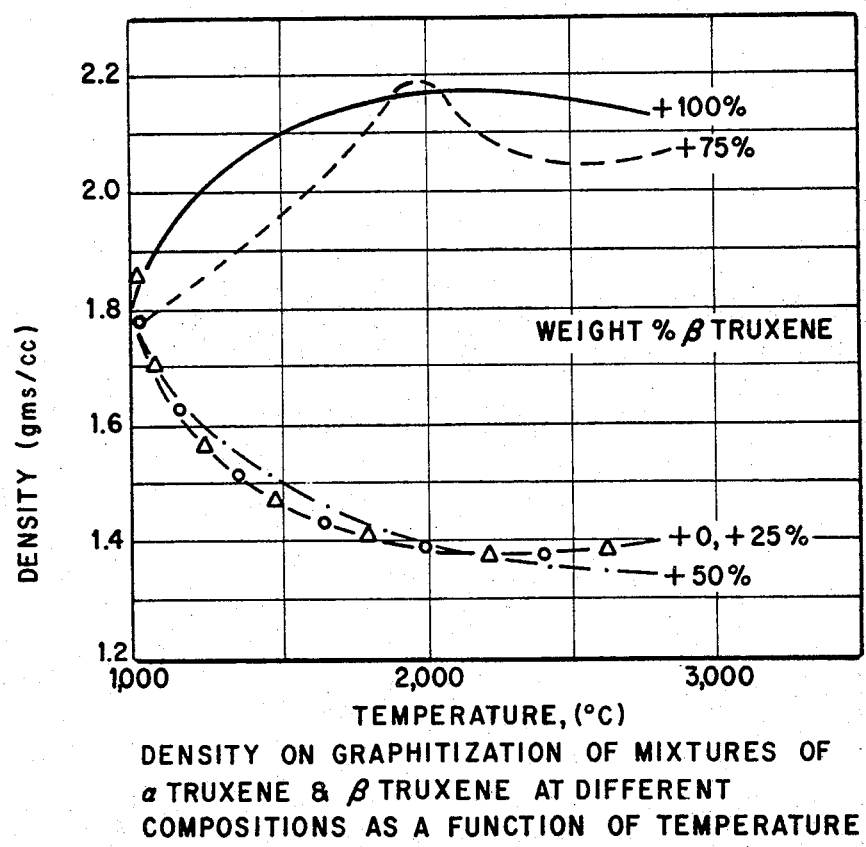
Figure 4:
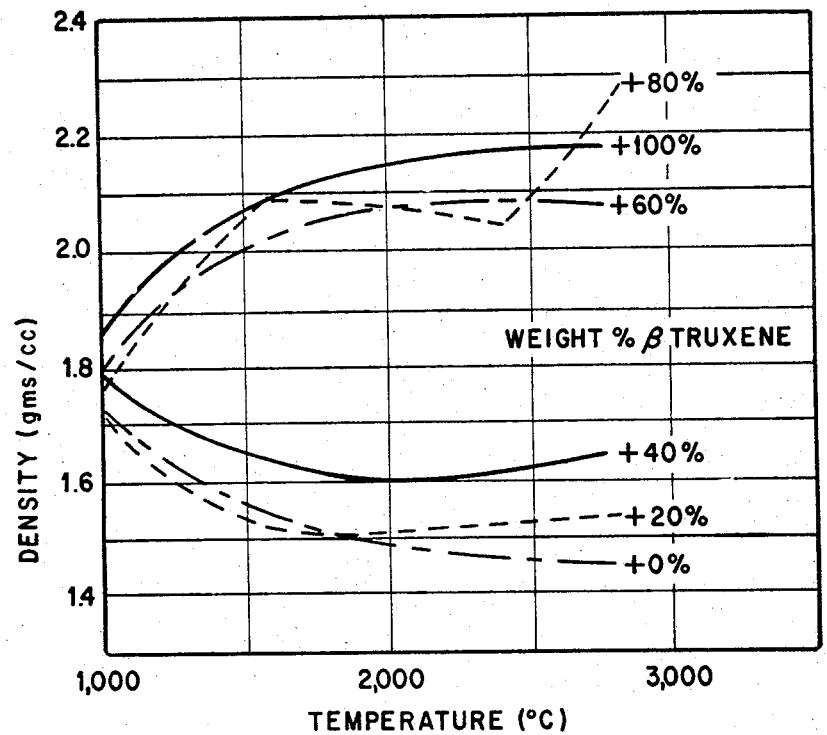

In the drawings:
FIG. 1 is an infrared spectrum of beta truxene;
FIG. 2 is an infrared spectrum of alpha truxene;
FIG. 3 is a graph on which are plotted density values of mixtures of alpha and beta truxene which have been exposed to graphitizing temperatures; and
FIG. 4 is a similar graph on which are plotted density values of mixtures of beta truxene and partially polymerized furfuryl alcohol.

SYNTHESIS OF TRUXENE

The starting point of our invention is based on the discovery of a facile and unique method for making truxene. We have found that indenes are converted to truxene when reacted in the presence of aromatic dicarbonyl compounds (such as paraquinones or paradialdehydes) and an aliphatic tertiary amine. We have found that the nature and amount of the predominant truxene isomer will depend on the choice of particular dicarbonyl compound used. While the role of the dicarbonyl compound in the reaction with indene is not understood, our findings have shown that:

(1) The dicarbonyl compound serves to initiate the reaction which leads to a truxene product.

(2) Though not incorporated in the product, the choice of a particular dicarbonyl compound will determine which of the truxene isomers is produced.

(3) The yield of a particular truxene isomer is proportional to the amount of dicarbonyl compound used in the reaction mixture.

(4) The tertiary amine is necessary to form truxene in the reaction of the dicarbonyl compound and indene.

(5) The corresponding aromatic dihydroxy compound (i.e., the reduced form) of a particular dicarbonyl compound will react (in the absence of a tertiary amine) with indene to produce a truxene isomer.

The following examples, I and II, are intended to illustrate typical procedures for forming truxene isomers.

Example I

This example illustrates a typical procedure for making β-truxene.

To a 5-liter flask equipped with a Dean-Stark trap, reflux condenser, and stirring apparatus, were added 316 grams of 1,4-naphthoquinone (about 2 moles), 3000 grams (about 26 moles) of indene, and 30 ml. of N,N,N',N' - tetramethyl-1,3-butanediamine. This mixture was heated under reflux (~180° C.) for 30 hours, and was transferred while molten into a beaker. On cooling to 100° C., the mixture began to thicken and an equal volume of 2-butanone was added with stirring. On cooling to room temperature, the mixture was filtered by vacuum filtration. The solid residue was washed with additional 2-butanone, and then dried. A total of 678 grams of a yellow crystalline product was collected. The product was observed to melt at 216 to 218° C. Recrystallization from hot xylene resulted in a melting point of 219 to 223° C. (literature 223.5 to 224.5° C.). Found: C, 94.2; H, 5.3; molecular weight, 341 (by vapor pressure osmometry), 342 (by mass spectrograph). Theoretical: C, 94.7; H, 5.3; molecular weight 342.

Our experience has shown that the water produced as a by-product of the described reaction must be continuously removed during the course of reaction in order to insure the formation of the desired truxene product. While lesser amounts of water are produced if lesser quantities of a selected dicarbonyl compound are used, product yields will be found to be in direct proportion to the quantity of the dicarbonyl compound used in the reaction.

Eight fractions of the recrystallization product were collected in succession by sublimation of a sample at 230° C. and 50 microns. Mass spectrometric analysis of the purified samples indicated a mass of 342. An infrared spectrum taken of a recrystallized sample dispersed in potassium bromide is shown in FIG. 1.

In order to confirm the identity of the product, an isomeric truxene mixture was prepared according to the procedure of Lang et al. as described in Chemische Berichte 93, 321–325 (1960). β-truxene was isolated from the isomeric mixture resulting from the Lang et al. procedure by taking advantage of significant differences in the solubility of α and β isomers in hot xylene. The isolated β-truxene was further purified by sublimation under vacuum. Its infrared spectrum was found to be identical to that observed for the product resulting from the reaction of indene and 1,4-naphthoquinone. A mixed melting point of the two compounds showed no depression. The nuclear magnetic resonance spectra of the two compounds were found to be identical, thus serving to further confirm the identity of the product.

The 1,4-naphthoquinone lost its identity during the reaction as evidenced by the loss of oxygen through the production of water and our inability to remove unreacted 1,4-naphthoquinone from the reaction mixture. However, the presence of 1,4-dihydroxynaphthalene and 1,4-naphthoquinhydrone was noted. The ease of interconversion of 1,4-quinones into their corresponding hydroquinones indicates not only the presence of 1,4-naphthoquinone and 1,4-dihydroxynaphthalene but also the presence of the adduct of these compounds, 1,4-naphthoquinhydrone. The role of the aliphatic tertiary amine appears to be that of a catalyst in reducing the dicarbonyl compound to dihydroxy or quinhydrone form. This was borne out by the fact that the beta truxene was isolated as a reaction product of 1,4-dihydroxynaphthalene and indene without the presence of a tertiary amine.

While a specific tertiary amine was used as a base catalyst, other aliphatic tertiary amines have been found to function effectively, among which are N,N,N',N'-tetramethyl-1,4-butanediamine; N,N,N',N'-tetramethylmethylenediamine; hexamethylenetetramine; dimethylbenzylamine; tripropylamine; and N-methylmorpholine. Aromatic tertiary amines have not been effective catalysts for truxene synthesis.

As previously mentioned, the apparent function of the dicarbonyl compound appears to be that it serves to selectively initiate, in combination with the tertiary aliphatic amine, the conversion of the indene to a truxene isomer. Thus, while in Example I, the reaction of 1,4-naphthoquinone with indene was shown to produce beta-truxene, the reaction of indene with 2-methyl-1,4-naphthoquinone will produce a truxene rather than the β-isomer. Table I below indicates the nature of the product produced from the reaction of various dicarbonyl compounds or hydroquinones with indene.

TABLE I.—PRODUCTS FROM THE REACTIONS OF VARIOUS QUINONES AND HYDRONONES

| Carbonyl compound | Product | Melting point (° C.) | Vapor pressure, osmometer | Mass spectrometer | Infrared absorption in the 800–700 cm.$^{-1}$ region [2] |
|---|---|---|---|---|---|
| 2,5-dichloro-1,4-benzoquinone | β Truxene | 223–225 | 336 | 342 | 754, 718 |
| 1,4-naphthoquinone | do | 219–223 | 341 | 342 | 754, 713 |
| 2-methyl-1,4-naphthoquinone | α Truxene | [3] 378 | 308 | | 730 |
| 2,3-dichloro-1,4-naphthoquinone | do | | 353 | 342 | 730 |
| Anthraquinone | do | [3] 379 | 334 | 342 | 730 |
| 2-methylanthraquinone | do | [3] 387 | 345 | | 730 |
| 2-chloroanthraquinone | do | 224–228 | 340 | | 754, 714 |
| 1,4-dihydroxynaphthalene [1] | β Truxene | 222–224 | 339 | | 753, 712 |
| Terephthaldehyde | α Truxene | [3] 385 | 343 | 342 | 728 |
| 9,10-dioxo-1,4,9,10,11,12-hexahydro-1,4-methyleneanthracene | β Truxene | 215 | 350 | 342 | 760, 716 |
| 9,10-dioxo-1,4,5,8,9,10,11,12,13,14-decahydro-1,4,5,8,-dimethyleneanthracene | α Truxene | >290 | | | 730 |
| 2,5-diphenyl-1,4-benzoquinone | Mixture | 225 | 383 | 342 | 730, 752, 713 |

[1] 1,4-dihydroxynaphthalene, a reduced form of 1,4-naphthoquinone is included.
[2] C—H wagging region for aromatic compounds having four adjacent hydrocarbons in one six-membered ring.
[3] Melting points from differential thermal analysis.

Example II

This example illustrates a typical procedure for making alpha truxene.

To a 5-liter flask equipped with a Dean-Stark trap, reflux condenser, and stirring apparatus were added 250 grams anthraquinone, 2500 grams indene and 25 ml. of the tertiary amine, N,N,N',N'-tetramethyl-1,3-butanediamine. This mixture was heated under reflux (~180° C.) for 30 hours, and was transferred while molten into a beaker. On cooling to 100° C., the mixture began to thicken whereupon an equal volume of 2-butanone was added with stirring. On cooling to room temperature, the mixture was filtered by vacuum filtration. The solid residue was washed twice with hot xylene to remove unreacted anthraquinone, and the resulting gold product was allowed to dry. A total of 218.7 grams of product was collected. The melting point as determined by differential thermal analysis was 379° C. The literature value as determined by differential thermal analysis was 375° C. Found: C, 94.6; H, 5.4; molecular weight, 342 (mass spectrograph). Theoretical: C, 94.7; H, 5.3; molecular weight, 342.

The isolated truxene product was purified by recrystallization using xylene as solvent and then sublimed at 250° C. under vacuum. An infrared spectrum of the sublimed truxene is shown in FIG. 2.

CONVERSION OF TRUXENE TO POLYMER

Both alpha truxene and beta truxene are suitable carbon precursors since they have high coking yields. However, the two isomers are not equivalent for use as a binder. The differences between the isomers become evident when they are each subjected to polymerization conditions. We have found that the β-isomer can be converted to polymer by an oxidizing reagent such as oxygen to yield a fusible thermoplastic resin which is convertible to carbon under coking conditions. However, the α-isomer fuses at temperatures in excess of 350° C., while fusion can be achieved at 220° C. with the β-isomer. Moreover, the polymer resulting from polymerization of the β-isomer is readily convertible to a graphite with coking yield in excess of 75%, while the α-isomer converts to amorphous (i.e., non-crystalline) carbon at equivalent coking yields.

The following example will illustrate the conversion of beta truxene to a low melting thermoplastic resin.

Example III

Beta truxene samples of equal size were heated for various lengths of time in air and in an inert (non-oxygen-containing) atmosphere at 300° C.

The samples which were heated in air were observed to lose crystallinity as signified by a decrease in melting point until a material of minimum melting point was obtained. Further heating in oxygen at the same or different temperatures results in an increase in fusion temperature. When heated to coking temperatures, coking yields of from 75 to 85% are obtained. On the other hand, samples that were treated at 300° C. in an inert atmosphere retained a high order of crystallinity and have much lower coking yields (of the order of 50%) on heating the sample through a carbonization cycle. The time required to attain a given minimum melting state of the low melting beta truxene polymer has been found to be dependent on sample size, exposed surface area, and temperature. The effect of the air cure treatment on the coking yield can be seen by the results in Table II below.

TABLE II
[Carbonization of α-truxene and β-truxene]

| Carbon precursor | Compound used in synthesis | Coke yield after 1,000° C. | |
|---|---|---|---|
| | | Without air cure [1] | With air cure [1] |
| α-Truxene | 2-methylanthraquinone | 57.7 | 88.1 |
| Do | Terephthaldehyde | 67.0 | 84.4 |
| Do | 2,3-dichloro-1,4-naphthoquinone | 59.4 | 87.4 |
| Do | (Commercial source) | 71.6 | 79.6 |
| β-Truxene | 1,4-naphthoquinone | 53.3 | 82.1 |
| Do.[1] | 2-chloroanthraquinone | 52.7 | 81.1 |
| α+β-Truxene | 2,5-dichloro-1,4-benzoquinone | 53.0 | 81.5 |

[1] Air cure consisted of heating samples in air under a controlled time rate cycle which reached a maximum of 300° C. after 48 hours.

The effect of time on the fusion temperature is shown in the following example.

Example IV

Two samples of beta truxene (prepared by the reaction of indene with 1,4-naphthoquinone) were heated in vessels at 300° C. in air for periods ranging from 1–31 hours. This procedure resulted in an approximate 10 percent weight loss and produced non-crystalline pitch-like material. The change of fusion temperature with time is shown in Table III below.

TABLE III.—MELTING POINT OF BETA TRUXENE ON HEATING IN AIR AT 300° C.

| | Melting point (° C.) | |
|---|---|---|
| | Batch A [1] | Batch B [2] |
| Time heated at 300° C. (hrs.): | | |
| 0 | 205–218 | 195–210 |
| 2 | | 142–211 |
| 4 | | 98–207 |
| 6 | | 89–198 |
| 8 | | 91–189 |
| 16 | 103–124 | |
| 17 | 104–118 | |
| 18 | 102–120 | |
| 19 | 98–120 | |
| 20 | 102–121 | |
| 21 | 104–125 | |
| 22 | 105–126 | 101–128 |
| 23 | 106–128 | |
| 24 | 110–135 | 118–133 |
| 25 | | 124–142 |
| 26 | | 129–146 |
| 27 | | 132–153 |
| 28 | | 131–156 |
| 29 | | 134–162 |
| 30 | | 136–164 |
| 31 | | 136–165 |

[1] Weight of beta truxene heated was 793 grams.
[2] Weight of beta truxene heated was 656 grams.

The product which melted in the range of 98 to 135° C. was a pitch-like material with an average molecular weight ranging from 405–460. The solubility of the material in xylene at room temperature was 14.2 grams/100 cc. as compared to ~1 gram/100 cc. for beta truxene at room temperature. Under reflux more than 100 grams of the material dissolved in 100 cc. of xylene as compared to a solubility of 42 grams/100 ml. for beta truxene at reflux.

Example V

The effect of surface area on fusion point and coke yield was measured by air heating beta truxene samples of the same weight in vessels of various sizes, thus producing differences in amount of exposed surface area. After heating in air the samples were then subjected to a coking cycle. The results are summarized in Table IV below.

TABLE IV

[Coke yield from 20-gram samples of beta truxene as a function of the surface area exposed during room temperature-to-250° C. cycle in air]

| | Surface area exposed [1] (cm.[2]) | Melting point after RT-to-250° C. cycle in air (° C.) | Coke yield [2] after RT-to-1,000° C.[3] cycle (wt. percent) |
|---|---|---|---|
| Vessel size (mls.): | | | |
| 50 | 11.636 | 108–131 | 71.3 |
| 100 | 17.220 | 108–128 | 70.7 |
| 250 | 32.860 | 112–142 | 76.0 |
| 400 | 45.592 | 114–151 | 80.1 |
| 600 | 59.858 | 120–158 | 82.9 |

[1] Difference in exposed surface area was accomplished by placing samples of equal size in vessels of varying sizes.
[2] Coking cycle included a room temperature-to-250° C. cycle in air for 48 hours followed by heating in an inert atmosphere from 250° C. to 1,000° C. for 50 hours.
[3] RT=Room temperature.

It is to be noted that the melting point of the air-exposed beta truxene varied with surface area. More importantly, the coke yield was shown to have increased with increasing exposed area of beta truxene.

Example VI

This example was undertaken to determine the effect of the precoking temperature in air as it relates to coking yield.

Twenty-gram samples of beta truxene were heated in air at 250° C. (Run A) and at 300° C. (Run B) for various lengths of time. These samples were then cured in air during a room temperature-to-250° C. cycle after which they were subjected to a coking cycle. Run C was heated in air at 300° C. and then subjected directly to a coking cycle. The results are summarized in Table V.

THE GRAPHITIZATION EFFECT

Example VII

We have previously compared the physical and chemical characteristics of alpha and beta truxene and have shown that the beta isomer fuses at much lower temperature than the alpha isomer. A still further distinction is noted in the capacity of the air cured isomers to convert to graphite.

Only the beta isomer-derived polymer yields graphitic carbon when carbonized and fired to graphitizing temperatures. While the initial air cure is essential to high coking yields for both isomers, it apparently alters the fusion characteristics of α-truxene at subcarbonization temperatures sufficiently to prevent graphitization at higher temperatures. On the other hand, air curing of beta truxene, while lowering the fusion temperature, does not affect the graphitizability of carbon from this source. The helium densities and data from X-ray diffractometer scans, as shown in Table VI below, indicate these differences in graphitic character.

The β-truxene samples after graphitizing exhibit densities very close to the theoretical density of graphite (2.25 g./cm.$^3$) as well as the characteristic graphite X-ray diffraction peak for the 002 plane. The carbon obtained from the α-truxene had a lower (1.6) density and no sharp X-ray diffraction peak for the 002 plane. This is characteristic for amporphous carbon. It can also be seen that the α-isomer is relatively infusible after the 250° C. air treatment.

TABLE VI.—GRAPHITIZATION OF ALPHA TRUXENE AND BETA TRUXENE

| Sample type | Sample size (gms.) | Melting point after RT-to-250° C. cycle in air (° C.) | Coking yield [1] RT-to-1,000° C. cycle (wt. percent) | Coking yield [1] RT-to-2,700° C. cycle (wt. percent) | Helium density after RT-to-2,700° C. cycle (gms./cc.) | Angle of reflection of 002 plane after RT-to-2,700° C. cycle (from X-ray diffractometer, 2θ° C.) | Description of reflection band of 002 plane |
|---|---|---|---|---|---|---|---|
| Min. malting β-truxene [2] | 20.0 | [3] –3 | 71.3 | 71.3 | 2.23 | 26.42 | Sharp. |
| Do.[2] | 20.0 | 128–166 | 76.5 | | | | |
| Do.[2] | 30.0 | 141–195 | 85.7 | 84.1 | 2.15 | 26.50 | Do. |
| Do.[2] | 50.0 | 121–138 | 87.4 | | | | |
| β-Truxene | 14.3 | | 80.7 | 79.1 | 1.90 | 26.62 | Do. |
| Do. | 136.8 | 138–172 | 74.4 | 69.9 | 2.00 | 26.44 | Do. |
| α-Truxene [4] | 20.0 | >300 | 91.0 | 83.1 | 1.36 | 26.30 | Broad. |
| Do.[5] | 2.6 | >300 | 87.9 | 78.8 | | 26.35 | Do. |
| Do.[5] | 2.7 | >300 | 82.9 | | | | |

[1] Coking cycles include a room temperature-to-250° C. cycle in air as well as a room temperature-to-1,000° C. coking cycle. Graphitization was accomplished by firing samples to 2,700° C.
[2] Prepared by heating beta truxene in air at 300° C. for approximately 20 hours.
[3] Sample did not go through room temperature-to-250° C. cycle in air.
[4] Obtained from K and K Laboratories, Inc. Plainview, New York.
[5] Prepared from the reaction of indene and anthroquinone.

In the preceding description we have shown that beta truxene can be converted to a low melting thermoplastic

TABLE V.—COKING YIELD OF BETA TRUXENE AFTER PREHEATING IN AIR

| | (A)[1] | | | (B)[1] | | | (C)[2] | |
|---|---|---|---|---|---|---|---|---|
| Length of time preheated [3] (hrs.) | Melting point after preheat at 250° C. (° C.) | Melting point after RT-to-250° C. cycle (° C.) | Coke yield after RT-to-1,000° C. cycle (wt. percent) | Melting point after preheat at 300° C. (° C.) | Melting point after RT-to-250° C. cycle (° C.) | Coke yield after RT-to-1,000° C. cycle (wt. percent) | Melting point after preheat 300° C. (° C.) | Coke yield after RT-to-1,000° C. cycle (wt. percent) |
| 0 | | 123–128 | 64.0 | | 123–128 | 64.0 | | |
| 4 | 130–211 | 139–150 | 55.7 | 104–116 | 123–138 | 62.2 | 198–214 | 50.1 |
| 8 | 145–205 | 124–139 | 55.9 | 104–110 | 128–140 | 62.1 | 105–122 | 52.4 |
| 12 | 135–164 | 115–127 | 60.0 | | | | 105–128 | 56.0 |
| 16 | 114–142 | 118–126 | 60.3 | 157–168 | >300 | 75.7 | 108–152 | 66.5 |
| 20 | 83–114 | 134–148 | 69.0 | 150–174 | >300 | 76.8 | 122–171 | 71.3 |
| 24 | 102–119 | 134–144 | 65.2 | 234–248 | >300 | 80.9 | | |

[1] After preheat, samples were heated in a room temperature-to-250° C. cycle in air previous to carbonization in a room temperature-to-1,000° C. cycle as per Table IV.
[2] After preheat, samples were placed directly in a room temperature-to-1,000° coking cycle as per Table IV.
[3] All samples consisted of 20 grams of beta truxene which were preheated in 100-milliliter beakers.

It will be noted that a pre-coking temperature in air at 300° C. (Run B) resulted in higher coke yields than when a pre-coking of 250° C. (Run A) was used. A comparison of Run B with with Run C indicates that the additional curing time in air at 250° C. as experienced by samples of Run B resulted in higher coking yields.

resin and thence to a highly graphitized product with high coking yields.

In the following examples we will show that these unique combinations of properties can be utilized with other binder materials where such other binders are otherwise useful but for their low coking yield or low tendency to graphitize.

Example VIII

This example shows how one may combine a low melting beta truxene resin with a relatively low coke yield binder to yield a binder mixture which can be carbonized to relatively high coke yields.

In this example, mixtures of air cured beta truxene and a partially polymerized furfuryl alcohol were air cured in a room temperature-to-250° C. air cycle followed by a coking cycle. The results are summarized in Table VIII below.

TABLE VIII.—COKE YIELD OF MIXTURES OF MINIMUM MELTING BETA TRUXENE AND PARTIALLY POLYMERIZED FURFUYL ALCOHOL

| Weight of minimum melting β-truxene [1] (gms.) | Partially polymerized furfuryl alcohol (gms.) | Weight of maleic anhydride [2] (gms.) | Melting point after RT-to-250° C. cycle °(C.) | Coke yield [3] after RT-to-1,000° C. cycle (wt. percent) |
|---|---|---|---|---|
| 20 | 0 | 0.8 | 181–189 | 88.94 |
| 16 | 4 | 0.8 | 230–290 | 83.17 |
| 12 | 8 | 0.8 | 255–>300 | 71.63 |
| 8 | 12 | 0.8 | >300 | 65.38 |
| 4 | 16 | 0.8 | >300 | 62.50 |
| 0 | 20 | 0.8 | >300 | 50.96 |

[1] Beta truxene, prepared from reaction of indene and 1,4-naphthoquinone, was subsequently heated for 20 hours at 300° C. in air.
[2] Used as a catalyst to effect polymerization of furfuryl alcohol.
[3] Coking cycle includes an initial room temperature-to-250° C. cycle in air prior to a room temperature-to-1,000° C. coking cycle.

The clear benefit in terms of coking yields is evident from the data which shows a progressive increase in coking yield with increasing amounts of beta truxene.

Example IX

Varying amounts of a low melting resin derived from air curing of beta truxene and a commercially available grade of pitch were mixed and subjected to an air cure followed by carbonization. The results are summarized in Table IX below.

TABLE IX.—COKE YIELDS OF MIXTURES OF MINIMUM MELTING BETA TRUXENE AND PITCH

| Weight of minimum melting β-truxene [1] (gms.) | Weight of pitch [2] (gms.) | Melting point after RT-to-250° C. cycle (° C.) | Coke yield [3] after RT-to-1,000° C. cycle (wt. percent) |
|---|---|---|---|
| 16 | 4 | 136–155 | 79.5 |
| 12 | 8 | 115–142 | 67.0 |
| 8 | 12 | 134–153 | 63.0 |
| 4 | 16 | 108–135 | 59.0 |
| 0 | 20 | 133–159 | 51.5 |

[1] Beta truxene, prepared from the reaction of indene and naphthoquinone, was subsequently heated for 20 hours at 300° C. in air.
[2] Product of the Allied Chemical Company, New York, New York.
[3] Carbonization cycles included a room temperature-to-250° C. cycle in air and a room temperature-to-1,000° C. time controlled cycle.

The use of beta truxene as a component in a mixture of binders therefor provides a way of increasing the coking yield of binder mixtures where other binders are deemed otherwise useful but for their low coking yields.

Example X

In Examples VIII and IX it was shown that the air cured resin derived from beta truxene can upgrade coke yields of binder mixtures in which one component gives a low coke yield when carbonized alone.

In this example we will show how a graphite structure can be obtained from a mixture of two binders, one component of which does not normally convert to graphite under graphitizing conditions.

Mixtures of alpha truxene and beta truxene containing 25, 50, and 75 weight percent beta truxene were air cured to 250° C., carbonized to 1000° C. in an inert atmosphere and subsequently fired to 1600, 2000, 2400, and 2800° C. Helium density data on these carbons were recorded in FIG. 3 as a function of temperature, along with those for alpha truxene and beta truxene. The difference in the helium densities of carbons from mixtures containing 50 percent and 75 percent beta truxene have significance. Of the mixtures studied, these two compositions represented a division between graphitizing and nongraphitizing carbon. Differences in the helium density data for carbons from alpha truxene and mixtures containing 50 percent or less of beta truxene were insignificant. X-ray diffraction scans of these carbons after 2800° C. emphasized the differences in properties of carbons from mixtures containing 50 and 75 percent beta truxene. Scans of the 002 planes of these carbons were in agreement with helium density data in that they showed the sharply defined peaks expected from a graphite structure.

Photomicrographs of these carbons after 2800° C. afforded another comparison of the mixture containing 50 and 75 percent beta truxene, and clearly illustrated a significant difference in the two carbons. Carbon from mixtures containing 50 percent beta truxene appeared completely amorphous, while that from the mixture containing 75 percent beta truxene appeared highly graphitic.

The photomicrographs of the carbons from mixtures of alpha truxene and beta truxene were compared with those obtained by initially mixing the cokes from beta truxene and alpha truxene, and firing those coke mixtures to 2800° C. In the latter case, two distinct carbon phases were observed regardless of the ratio in which the cokes were mixed. Thus, beta truxene and alpha truxene, acting independently produced amorphous and graphitic carbons, respectively. Helium density data on these carbons indicated a mere averaging of physical properties of the two components. By comparison, the influence of alpha truxene on the properties of beta truxene and vice-versa, were apparent when the two hydrocarbons were carbonized in combination. Thus, alpha truxene, though highly aromatic, cannot be graphitized because it does not completely fuse before or during carbonization. The fact that no graphitic carbon was produced from mixtures of alpha and beta isomers containing up to 50 weight percent beta truxene indicates that these mixtures have fusion characteristics that prohibit graphitization. The fact that mixtures containing 75 percent beta truxene do graphitize suggests formation of a solution at elevated temperatures of alpha isomer in the excess beta isomer, thus affording suitable fusion characteristics during carbonization.

Example XI

This example provides another illustration of how beta truxene can be used to form a graphitized carbon from a mixture of materials, one of which is non-graphitizable.

Samples of partially polymerized furfuryl alcohol were air cured to 250° C. carbonized to 1000° C. in an inert atmosphere, and subsequently fired to 1600, 2000, 2400, and 2800° C. Helium density data indicated that the product was amorphous carbon with closed porosity at temperatures above 1000° C. A photomicrograph of the carbon after 2800° C. also indicated amorphous carbon. An X-ray diffraction scan of the 002 plane of the carbon after 2800° C. was broad and diffuse, characteristic of an amorphous carbon.

By way of comparison, mixtures of low melting resin derived from beta truxene and partially polymerized furfuryl alcohol were air cured to 250° C., carbonized to 1000° C., and subsequently fired to 1600, 2000, 2400, and 2800° C. Helium density data on these carbons are also presented in FIG. 4 (as a function of temperature), along with the data for individual samples of unmixed beta truxene and partially polymerized furfuryl alcohol.

When the carbon precursor yielding a graphitic carbon was present in the greater quantity, the graphitizability of the disordered carbon was enhanced and the probability of closed porosity was decreased. Likewise, when present in the greater amount, the carbon precursor yielding the disordered (i.e., amorphous) carbon appeared to inhibit graphitization and increased the probability of closed porosity.

Mixtures containing greater than 50 percent beta truxene yielded carbons that increased in density at carbonizing temperatures above 1000° C., while those with greater than 50 percent of the partially polymerized furfuryl alcohol underwent a decrease in density at these temperatures and yielded a disordered carbon structure having closed porosity as determined by helium density measurements.

The difference in the properties of the carbons from the mixtures containing 60 to 40 percent beta truxene was significant, and represents a division between graphitizing and non-graphitizing carbon with respect to this system. X-ray diffraction scans of the 002 planes of the carbons after 2800° C. and photomicrographs corroborated the helium density findings.

Carbon from samples containing 60 percent or more of the beta truxene derived resin was graphitic with open porosity, while carbon from the mixture containing 40 percent beta truxene was amorphous carbon with closed porosity. The difference in the properties of these two carbons was greater than would be anticipated from mere averaging of physical properties, as might be true for simple dilution processes.

We claim:

1. A method for polymerizing crystalline truxene which comprises heating truxene with an oxidizing reagent selected from the group consisting essentially of air or oxygen at a temperature in the range of 250°–300° C. sufficient to erase the crystallinity of the truxene and reach a thermoplastic state as evidenced by a decrease in the melting point of the mixture relative to the melting point of the truxene starting material.

2. The method according to claim 1 wherein the truxene is beta truxene.

3. A thermoplastic resinous material comprising polymerized beta truxene derived from heating said beta truxene in an oxygen-containing atmosphere to and maintaining said beta truxene at a temperature in the range of 250°–300° C., sufficient to convert said beta truxene to a thermoplastic resin, said resin being further characterized in that it is convertible to graphite after being coked and heated to a graphitizing temperature.

References Cited

UNITED STATES PATENTS

| | | | |
|---|---|---|---|
| 2,157,544 | 5/1939 | Kline | 260—668 F |
| 2,216,001 | 9/1940 | Dietzel | 260—668 F |
| 2,373,714 | 4/1945 | Soday | 260—93.5 C |
| 2,504,044 | 3/1970 | Harper et al. | 260—668 F |

FOREIGN PATENTS

| | | | |
|---|---|---|---|
| 968,215 | 9/1964 | Great Britain | 23—209.1 |

JAMES A. SEIDLECK, Primary Examiner

U.S. Cl. X.R.

260—668 F